United States Patent Office 3,679,413
Patented July 25, 1972

3,679,413
PHOTOGRAPHIC PROCESS WHICH PRODUCES NEUTRAL DYE IMAGE IN DIAZOTYPE MATERIAL
William C. Gray, Jr., Rochester, N.Y., assignor to Eastman Kodak Company, Rochester, N.Y.
No Drawing. Continuation-in-part of application Ser. No. 657,077, July 31, 1967, now Patent No. 3,573,051, dated Mar. 30, 1971. This application Sept. 21, 1970, Ser. No. 74,230
Int. Cl. G03c 1/54, 1/58, 5/18
U.S. Cl. 96—49                                                                 6 Claims

ABSTRACT OF THE DISCLOSURE

A two-component diazotype composition which provides, upon exposure and development, a neutral image with low contrast is obtained by employing as the light-sensitive layer a polymeric matrix such as cellulose acetate having dispersed therein a light-sensitive diazotype composition comprising (1) as the diazo component, a 2,5-dialkoxy-4 - morpholinobenzene diazonium salt, and optionally a 4-(dialkylamino)benzene diazonium salt; (2) as a blue coupler, at least one of a 2-hydroxy-N-(2-alkyl phenyl)-3-naphthamide, and a 2-hydroxy-N-(2,4-dialkoxy-5-halophenyl)-3-naphthamide; and (3) as a yellow coupler, an N-substituted or N,N-di-substituted 1-hydroxy-2-naphthamide or a 2-acylamido-5-alkylphenol. The diazotype composition is preferably stabilized against premature coupling by the presence of acid stabilizers such as 5-sulfosalicyclic acid. These compositions are conveniently processed by contact with an alkaline medium, such as one containing ammonia. Additionally, formulations containing the phenol coupler are advantageously processed by contact with high pressure anhydrous ammonia.

---

This application is a continuationn-in-part of Ser. No. 657,077, filed July 31, 1967, and issued Mar. 30, 1971, as U.S. Pat. 3,573,051.

This invention is related to photography, and is concerned particularly with a novel two-component diazotype system which, after exposure and development, provides a neutral image with low contrast.

Two-component diazotype reproduction media have long been known. These media comprise a polymeric matrix containing at least one diazo salt and at least one coupler which reacts with the diazo salt to form a dye. In addition there may be present various other additives, such as ultraviolet absorbers, stabilizers to prevent premature coupling of the diazo salt and coupler and the like. These compositions have been generally employed as duplicating media by exposure to activating radiation, e.g., light, through an original, whereby the transmitted light decomposes the diazo salt. After exposure the film is normally treated with an alkaline medium, usually ammonia, to promote coupling of the undecomposed diazo salt and coupler, thereby forming a dye in the unexposed areas and producing an image corresponding to that of the original.

Initially the dyes employed in diazotype media were of various colors, such as purple, blue and the like. More recently, however, attempts have been made to devise systems which will provide a neutral, i.e., black, grey and white, image similar to that obtained with a silver halide film. In general, these latter systems employ at least two couplers, one of which, if used alone, would form a blue dye, and the other of which, if used alone, would form a yellow dye.

The earliest neutral image systems provided a developed image of very high contrast and, while generally satisfactory for reproducing line drawings and the like, were generally unsatisfactory for reproducing intermediate tones. Subsequently there have been developed systems which provide a reasonably accurate image of half-tone originals. It has been found, however, that these latter systems, although satisfactory for producing copies of originals, cannot be employed to provide subsequent reproductions of such copies, a problem which is particularly acute in the case of libraries and the like wherein substantial use is made of film reproductions such as microfilm and the like. For example, the original of "first generation" film is normally a conventional silver-based film. Because of the lower expense of diazotype media, these films are frequently used by libraries or other depositories to provide reproductions, i.e., a "second generation" of the original silver-based film. This sequence is frequently carried on through a third or even a fourth generation reprint. In the prior systems, although the second generation print frequently approached the quality of the silver-based, or first generation, print the third and fourth generations evidenced a progressive increase in contrast and loss of detail, which also operated to inhibit exposure latitude.

Recently, it has become known in the art that certain diazotype compositions can be processed by treatment with anhydrous ammonia applied at elevated pressure according to the processes described, for example in U.S. Pats. 3,427,162; 3,427,163; 3,427,164 and 3,427,165. In the known processes, however, the diazotype compositions contain only one coupler compound, usually one that forms an azo dye having high U.V. opacity. The primary disadvantage characteristic of these azo dyes is their low visual density. The visible image appears washed-out, and is not conveniently viewable, especially when ambient lighting is low. This is due in part to the yellowish images produced by dyes having substantial U.V. opacity.

It has been indicated that other couplers can be added to high-pressure anhydrous ammonia developable diazotype compositions of the known type in order to enhance visual density, but no specific couplers have been suggested. Over the years, it has been found that neutral tone images are most desirable for convenience in viewing, and numerous attempts have been made to produce diazotype compositions that yield black dye images on development. The difficulty in obtaining neutral tone images is caused by the coupling rates characteristic of each coupler. For example, to obtain a black line image from blue and yellow dye forming couplers, one must obtain couplers whose rate of reaction with the particular diazonium salt and under the selected development conditions is such that optically balanced dye concentrations are produced.

Although black line formulations have been produced for aqueous ammonia development processes, these formulations do not operate in the same fashion under development conditions including high pressure anhydrous ammonia since coupling rates are dependent in part on the processing method. The diazotype compositions presently available for high pressure anhydrous ammonia processing have not been designed to produce neutral hue images and have not included multiple coupler compounds.

Accordingly, it is an object of this invention to provide new light-sensitive, diazotype dye-forming compositions which, upon development, exhibit an improved neutral color dye image.

It is another object of this invention to provide novel high-sensitive diazotype compositions which can produce reduced contrast copies, especially subsequent to second generation copies.

Still another object of the present invention is to provide new diazotype photographic elements which utilize the subject light-sensitive, diazotype compositions.

Still an additional object of the present invention is to provide diazotype compositions that can be developed by high pressure anhydrous ammonia techniques to yield neutral tone images.

These and additional objects of the instant invention will become apparent from a consideration of the following specification and appended claims.

The objects of the invention described herein are accomplished with a two-component, light-sensitive azo dye forming system which is, for example, useful in diazotype reproduction media and especially diazotype photographic elements which on exposure and development provide a neutral imagewise copy which faithfully reproduces the original with improved exposure latitude through the third and even fourth generations, such azo dye-forming systems employing certain diazonium salts and yellow and blue couplers as described herein.

The diazonium salt which is employed in accordance with this invention is a 2,5-di-lower-alkoxy-4-morpholino-benzene diazonium salt as represented by the formula:

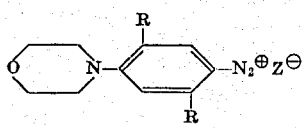

(I)

wherein each R is a lower alkoxy radical, preferably having from 1 to 2 carbons, and especially ethoxy; and Z is an anion, preferably the chlorozincate, the fluoborate or the chlorostannate anions, and especially the fluoborate anion.

In addition to the diazo salt of Formula I there can be employed 4-(diloweralkylamino)benzene diazonium salt as a second salt of the formula:

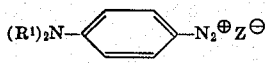

(II)

wherein each $R^1$ is a lower alkyl radical, preferably of from 1 to 2 carbons, and especially ethyl, and Z is as defined above.

The blue coupler which is employed in accordance with this invention is a 2-hydroxy-N-(2-loweralkoxyphenyl)-3-naphthamide of the formula:

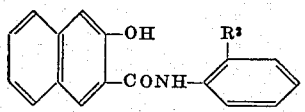

(III)

wherein $R^2$ is a lower alkoxy radical, preferably of from 1 to 2 carbons, and especially methoxy.

In admixture with, or in lieu of, the blue coupler of Formula III there can be employed a 2-hydroxy-N-(2,4-diloweralkoxy-5-halophenyl)-3-naphthamide blue coupler of the formula:

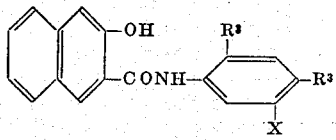

(IV)

wherein each $R^3$ is a lower alkoxy radical, preferably of from 1 to 2 carbons, and especially methoxy and X is a halogen atom, preferably chlorine.

The yellow coupler which is employed in accordance with this invention can be a 1-hydroxy-N-substituted-2-naphthamide as represented by the formula:

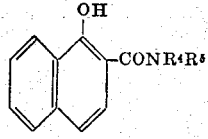

(V)

wherein $R^4$ is a hydrogen atom or a lower alkyl radical, preferably ethyl or propyl; $R^5$ is a lower alkyl radical, preferably ethyl or propyl and $R^4$ and $R^5$ when taken together are a lower alkylene radical which, when taken with the amide nitrogen, forms a 5- to 7-membered heterocyclic ring, and preferably are pentamethylene.

As an alternative, and in a second embodiment, one can employ as a yellow coupler a 2-loweralkanoylamido-5-loweralkylphenol of the formula:

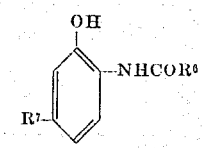

(VI)

wherein $R^6$ and $R^7$ each are a lower alkyl radical, preferably having from 1 to 2 carbons, and especially methyl.

The lower alkoxy and alkyl radicals in the above described diazonium salts and couplers can suitably have 1 to 8 carbon atoms and more generally have 1 to 4 carbon atoms. Lower alkylene radicals are those suitably having from 1 to 6 carbon atoms with from 1 to 4 carbon atoms being preferred.

To achieve neutral images which faithfully reproduce an original, even through a third or fourth generation copy, it has been found that the proportions of diazo salt and blue and yellow couplers are only susceptible of moderate variation. As noted above the presence of a diazo salt of Formula II is optional; however, when present it should be employed in a less than equimolar ratio in relation to the salt of Formula I, with the preferred ratio of diazo salt I to diazo salt II being in the range of from about 1:1 to about 3:1.

The relative proportion of blue coupler IV to blue coupler III, when both are present can be widely varied although a molar ratio of from about 1.5:1 to about 2:1 is generally preferred. On the other hand, the ratio of blue coupler to yellow coupler should be kept within rather narrow limits. When a naphthamide of Formula V is employed as the yellow coupler the molar ratio of the combined moles of blue coupler to yellow coupler should be from about 1.5:1 to about 2.5:1, with a molar ratio of from about 1.75:1 to about 1.95:1 being preferred. When an alkanoylamidophenol of Formula VI is employed as the yellow coupler, however, the molar ratio of blue to yellow coupler is desirably from about 0.5:1 to about 1.5:1, with a ratio of from about 0.9:1 to about 1.1:1 being particularly preferred.

Finally, the ratio of total moles of blue and yellow coupler to the total moles of diazo salt should be at least 1:1, with best results being obtained when the ratio is in the range of from about 1:1 to about 1.5:1 and more particularly at a ratio of from about 1.1:1 to about 1.3:1. Higher coupler concentration is possible, but not preferred due to the unnecessary excess of unreacted coupler.

The choice of which diazo salt, blue coupler and yellow coupler is to be employed in the dye-forming system of this invention is governed by the properties desired in the diazotype medium. In general, formulations containing a naphthamide of Formula V are useful in the conventional "dry" ammonia developers, whereas those employing an acylamidophenol of Formula VI are particularly useful in high pressure "anhydrous" ammonia developers, such as those disclosed in British Pat. No. 1,043,836.

In the embodiment in which the naphthamide of Formula V is the yellow coupler, the speed and color balance of the diazo film is dependent upon the presence or absence of a diazo salt of Formula II. Thus, although a relatively slower film is obtained when salts of this type are present, the film is particularly valuable when a completely neutral image is essential. On the other hand, omission of the diazo salt of Formula II, although providing a faster film, results in a product which tends to give a somewhat colored (blue) image. In this embodiment, the blue coupler of Formula IV is not employed unless the diazo salt of Formula II is present.

When an alkanoyl amidophenol of Formula VI is employed as the yellow coupler, the diazo salt is desirably that of Formula I, whereas the blue coupler is desirably that of Formula IV.

The dye-forming components described above are generally employed in the form of a film in which the components are dispersed in a polymeric matrix which is coated upon a suitable support. Typical matrix polymers are cellulose esters such as cellulose acetate, cellulose butyrate and cellulose acetate-butyrate, and also vinyl polymers like poly(vinyl acetate), poly(vinylidene chloride) and poly(vinyl butyral). Another typical polymer is 4,4' - isopropylidene-diphenyl - 2-hydroxy-1,3-propylene ether. Similarly, the concentration of the dye-forming components in the polymeric matrix is not narrowly restricted, although concentrations of from about 20 to about 40 parts by weight per 100 parts of matrix polymer are normally employed, with concentrations in the range from about 25 to about 35 parts per 100 parts being preferred.

In addition to the dye-forming components, the polymeric matrix can also contain other additives to modify the properties of the film, such as ultraviolet absorbers, stabilizers and the like. A preferred class of additives comprises the known acid stabilizers which prevent premature coupling of the azo salt and the coupler. These acid stabilizers include organic acids such as 5-sulfosalicylic acid and the like. In general, organic acids are preferably present in all of the formulations of this invention, with the amount normally varying from about 1 to about 6, and preferably from about 2 to about 5 parts by weight per 100 parts of polymeric matrix. In addition, when a diazo salt of Formula II above is present, it is preferred that a metal salt, preferably zinc chloride, be present as a dye brightener or development accelerator, generally in an amount varying from about 0.5 to about 2 parts, and preferably from about 1 to about 1.5 parts, by weight per 100 parts of matrix polymer.

A second, and especially desirable, class of additives to the compositions of this invention are hindered phenols containing, in the 2-position, either an alkyl or a cycloalkyl radical and, in the 4-position, either an alkyl radical, an alkoxy radical, a hydroxyl radical or a thioether radical which with the hindered phenolic moiety completes a hindered bisthiophenol and more generally a symmetrical bis-thiophenol.

Typical useful hindered phenols employed herein include those having the formulas:

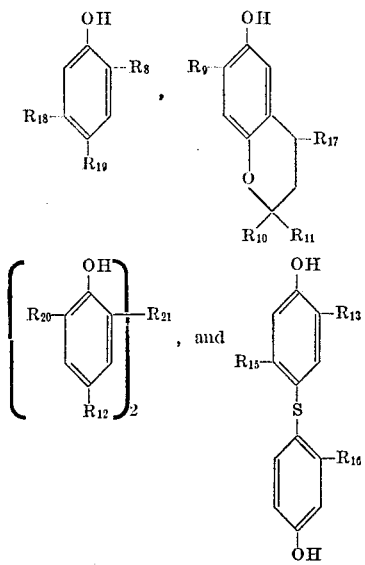

wherein each of $R_8$ through $R_{16}$ is an alkyl radical; each of $R_{17}$ and $R_{18}$ is either a hydrogen atom or an alkyl radical; $R_{19}$ is either a hydroxyl radical, an alkyl radical or an alkoxy radical; $R_{20}$ is either an alkyl radical or a cyclolakyl radical; and $R_{21}$ is a lower alkylene radical.

As comprehended herein, an alkyl radical is a straight or branched chain alkyl radical having from 1 to about 18 carbon atoms. Typical such alkyl radicals are, for example, methyl, ethyl, isopropyl, tert-butyl, tert-octyl, dodecyl, tetradecyl and the like. Cycloalkyl radicals as described herein are saturated monovalent carbocyclic radicals having 4 to 6 nuclear carbon atoms, such as cyclobutyl, cyclopentyl, cyclohexyl, 1-methylcyclohexyl and the like radicals. Alkoxy radicals as defined herein are straight or branched chain alkoxy radicals having from 1 to about 18 carbon atoms. Illustrative alkoxy radicals are methoxy, carboxymethoxy, ethoxy, butoxy, octoxy, dodecoxy, tridecoxy, α-ethoxycarbonyltridecoxy and the like. Lower alkyl and alkoxy radicals herein are typically straight or branched chain alkyl or alkoxy radicals having from 1 to 8 carbon atoms with from 1 to 4 carbon atoms being preferred. Typical such radicals are, for example, methyl, methoxy, ethyl, ethoxy, propyl, isopropyl, propoxy, tert-butyl, butoxy, octyl, octoxy, etc. Lower alkylene radicals as noted herein are alkylene radicals having from 1 to 4 carbon atoms, such as methylene, ethylene, propylene and butylene.

Particularly useful hindered phenols employed in the subject invention include compounds of the formula:

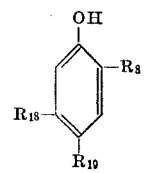

wherein $R_8$ is an alkyl radical and preferably a tertiary alkyl radical having 4 to 8 carbon atoms; $R_{19}$ is either a hydroxyl radical, an alkyl radical or an alkoxy radical; and $R_{18}$ is (1) a hydrogen atom when $R_{19}$ is an alkyl radical, (2) an alkyl radical when $R_{19}$ is a hydroxyl radical and (3) either a hydrogen atom or an alkyl radical when $R_{19}$ is an alkoxy radical;

compounds of the formula:

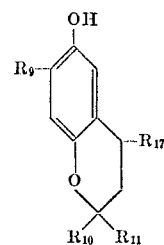

wherein each of $R_9$ to $R_{11}$ is an alkyl with $R_3$ and $R_4$ preferably being methyl radicals and $R_{17}$ is either a hydrogen atom or an alkyl radical;

compounds of the formula:

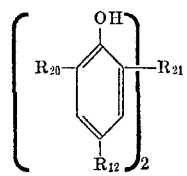

wherein $R_{12}$ is an alkyl radical, $R_{20}$ is either an alkyl radical or a cycloalkyl radical and $R_{21}$ is a lower alkylene radical, preferably a methylene or an ethylene radical; and compounds of the formula:

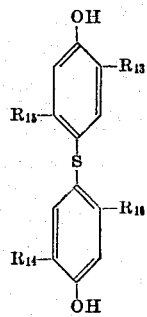

wherein each of $R_{13}$ to $R_{16}$ is an alkyl radical and $R_{13}$ and $R_{14}$ are preferably tertiary alkyl radicals having from 4 to 8 carbon atoms.

Typical specific hindered phenols useful in this invention include, for example, such compounds as:

(a) 2-tert-butyl-4-($\alpha$-ethoxycarbonyltridecyloxy)phenol,
(b) 2-tert-butyl-4-dodecoxyphenol,
(c) 2-tert-butyl-4-methoxyphenol,
(d) 2-tert-butyl-4-(carboxymethoxy)phenol,
(e) 2-tert-octyl-4-methoxy phenol,
(f) 2,5-di-tert-butyl-4-methoxy phenol,
(g) 2-tert-butyl-4-methyl phenol,
(h) 2-tert-octyl-4-methyl phenol,
(i) 2,5-di-tert-butylhydroquinone,
(j) 2,5-di-tert-octyl hydroquinone,
(k) 2,2-dimethyl-4-isopropyl-7-tert-butyl-6-chromanol,
(l) 2,2-dimethyl-4-isopropyl-7-tert-octyl-6-chromanol,
(m) 2,2-dimethyl-4-isopropyl-7-tetradecyl-6-chromanol,
(n) 2,4-trimethyl-7-isopropyl-6-chromanol,
(o) 2,2-dimethyl-7-tert-butyl-6-chromanol,
(p) 2,2'-methylenebis[6-(1-methylcyclohexyl)-4-methylphenol],
(q) 2,2'-methylenebis(6-tert-butyl-4-methylphenol),
(r) 2,2'-methylenebis(6-tert-butyl-4-ethylphenol),
(s) 2,2'-methylenebis(4,6-di-tert-butylphenol), and
(t) 4,4'-thiobis(2-tert-butyl-5-methylphenol).

The stabilizing amount of hindered phenol is generally in the range of from about 0.8 to about 3 moles per total moles of diazonium salt, and preferably in the range of from about 0.9:1 to about 1.7:1 moles.

The dye-forming components and other additives, when employed, are dispersed in the matrix polymer by any convenient technique, preferably by admixing all components in a common solvent. A particularly preferred solvent system comprises a mixture of a halogenated aliphatic hydrocarbon, especially ethylene chloride, and an alkanol, especially ethanol. The order of addition of the ingredients is variable, although it is preferred that acid stabilizers be added to the solution prior to the diazonium salts. Similarly, the amount of solvent is not critical, although it is preferred that the resulting solution contain from about 5 to about 15 weight percent solids and preferably from about 8 to about 12 percent solids.

The resulting solution is then employed to cast or coat a film in accordance with generally known techniques. Although not essential, typically the film is coated on a suitable support such as a cellulose ester like cellulose acetate, polyethylene terephthalate, polystyrene, or paper, preferably coated with one of the above materials and alternatively, polyethylene or a polypropylene, or suitably subbed with, for example, barium sulfate and the like to provide a composite, light-sensitive photographic element. The solution should be applied to the support at a rate sufficient to provide an optical density, when developed, of between .8 and 3, with densities of from 1 to 2 being typically employed. If the density is less than .8 the resulting film will have a poor latitude. On the other hand, with densities in excess of 3 the image obtained after development will have too high a contrast to be useful for making halftone reproductions.

The resulting light-sensitive photographic element can be exposed or developed in any conventional manner. As is pointed out above, however, those compositions wherein the yellow coupler is a 1-hydroxy-2-naphthamide are especially suited for development by the more conventional ammonia processes, whereas those compositions wherein the yellow coupler is a 2-acylamidophenol are especially suited for the more recently developed high pressure anhydrous ammonia development techniques.

The high pressure anhydrous ammonia development technique conventionally entails applying substantially anhydrous ammonia to an imagewise exposed diazotype element, such as those neutral tone image-forming elements of the present invention containing a 2-acylamido-5-substituted phenol coupler, or those elements described in U.S. Pats. 3,427,162; 3,427,163; 3,427,164 or 3,427,165 (not neutral tone image formers). Generally, the ammonia is applied at a high pressure, e.g., from about 35 pounds per square inch to about 985 pounds per square inch. An azo dye image forms rapidly and without moisture. A unit for high pressure ammonia development of diazo materials is commercially available, being manufactured by International Business Machines.

The following examples are illustrative of the invention. All parts expressed are parts by weight.

EXAMPLE I

A solution of 6.35 parts 2,5-diethoxy-4-morpholinobenzene diazonium fluoborate, 4.45 parts 4-(diethylamino) benzene diazonium fluoborate, 1.50 parts 2-hydroxy-N-(2-methoxyphenyl)-3-naphthamide, 3.18 parts 2-hydroxy-N-(2,4 - dimethoxy-5-chlorophenyl)-3-naphthamide, 2.32 parts 1-hydroxy-2-naphthopiperidide, 3.07 parts zinc chloride, 3.07 parts 5-sulfosalicyclic acid, 9.18 parts 2,2'-methylenebis[6-(1-methylcyclohexyl) - 4 - methylphenol], 5.71 parts 2,2-dimethyl-4-isopropyl-7-tert-butyl-6-chromanol, and 63.10 parts of cellulose acetate is prepared in a 4:1 ethylene chloride ethanol solvent system at 10 percent solids. The solution is then coated on a subbed poly-(ethylene terephthalate) support at a rate sufficient to provide a density of 1.75 in the coated element The photographic element is then dried. A first portion of the element is exposed through a step wedge incorporating .3 Log E density increments to a mercury arc lamp, rich in ultraviolet rays, and is then developed by contacting the exposed element with aqueous ammonia vapors. A second portion is exposed and developed in a similar manner, except that the exposure is made through the developed first portion. A third portion is exposed and developed in a like manner, except that the exposure is through the developed second portion. The evaluation of the three developed elements is summarized below in tabular form, illustrating the substantial preservation of contrast through the third generation print.

OPTICAL DENSITY

| Step | Portion 1 | Portion 2 | Portion 3 |
|---|---|---|---|
| 1 | 0.06 | 0.10 | 0.16 |
| 2 | 0.20 | 0.16 | 0.17 |
| 3 | 0.60 | 0.60 | 0.58 |
| 4 | 1.02 | 1.04 | 1.13 |
| 5 | 1.30 | 1.28 | 1.28 |
| 6 | 1.49 | 1.34 | 1.32 |
| 7 | 1.60 | 1.36 | 1.33 |
| 8 | 1.64 | 1.37 | 1.33 |

EXAMPLE II

A solution of 2.54 parts 4-morpholinobenzene diazonium fluoborate, 1.00 part 2-hydroxy-N-(2-methylphenyl)-3-naphthamide, 0.454 part 1-hydroxy-2-naphthopiperidide, 0.60 part 5-sulfosalicyclic acid, 1.12 parts 2,2-dimethyl-4-isopropyl-7-tert-butyl - 6 - chromanol, 1.80 parts 2,2'-methylenebis-[6-(1-methylcyclohexyl) - 4 - methylphenol]

and 12.50 parts cellulose acetate is prepared in a 4:1 ethylene chloride-ethanol solvent system at 9 percent solids, and the solution is coated and dried as described in Example I. Also employing procedures similar to those of Example I, a first portion is exposed and developed and a second portion is exposed through the first portion, and developed. The evaluation of these two developed portions is summarized below in tabular form showing a substantial preservation of initial contrast.

OPTICAL DENSITY

| Step | Portion 1 | 2 |
|---|---|---|
| 1 | 0.08 | 0.13 |
| 2 | 0.21 | 0.21 |
| 3 | 0.65 | 0.67 |
| 4 | 1.03 | 1.09 |
| 5 | 1.28 | 1.25 |
| 6 | 1.43 | 1.36 |
| 7 | 1.50 | 1.36 |
| 8 | 1.53 | 1.37 |

EXAMPLE III

A solution of 9.25 parts 4-morpholinobenzene diazonium fluoborate, 5.72 parts 2-hydroxy-N-(2-methoxyphenyl)-3-naphthamide, 2.65 parts 5-acetamido-2-methylphenol, 3 parts 5-sulfosalicylic acid, and 79.4 parts cellulose acetate is prepared in a 4:1 ethylene chloride-ethanol solvent system at 10 percent solids. The solution is coated and dried as described in Example I. Also employing procedures similar to those of Example I, a first portion is exposed and developed except that development is accomplished by exposure to high pressure anhydrous ammonia vapors and a second portion is exposed through the first portion and developed in a like manner. The evaluation of these two developed portions is summarized below in tabular form showing a substantial preservation of initial contrast.

OPTICAL DENSITY

| Step | Portion 1 | 2 |
|---|---|---|
| 1 | 0.08 | 0.13 |
| 2 | 0.12 | 0.14 |
| 3 | 0.38 | 0.44 |
| 4 | 0.73 | 0.80 |
| 5 | 0.96 | 0.99 |
| 6 | 1.09 | 1.08 |
| 7 | 1.18 | 1.11 |
| 8 | 1.23 | 1.12 |

Although the invention has been described in considerable detail with reference to certain preferred embodiments thereof, it will be understood that variations and modifications can be effected without departing from the spirit and scope of the invention as described hereinabove and as defined in the appended claims.

We claim:

1. A photographic process for producing an azo dye image that is a neutral image of low contrast on an imagewise exposed photographic element comprising a support having coated thereon a diazotype composition comprising a polymeric matrix containing
   (a) as a diazonium salt component, a benzene diazonium salt selected from the group consisting of
      (1) a 2,5-diloweralkoxy-4-morpholinobenzene diazonium salt and
      (2) a combination of 2,5-diloweralkoxy-4-morpholinobenzene and 4-(diloweralkylamino)benzene diazonium salts,
   (b) as a blue coupler component, a coupler selected from the group consisting of a 2-hydroxy-N-(2-loweralkoxyphenyl) - 3 - naphthamide, a 2-hydroxy-N-(2,4-diloweralkoxy - 5 - halophenyl)-3-naphthamide and mixtures thereof, and
   (c) as a yellow coupler component, a 2-loweralkanoylamido-5-loweralkylphenol, and also including an acidic stabilizer to prevent premature coupling in said composition, wherein the molar ratio of blue coupler to yellow coupler is from about 0.5:1 to about 1.5:1, which process comprises developing said element by contacting it with anhydrous ammonia at high pressure.

2. A photographic process as described in claim 1 wherein the diazonium salt component is said 2,5-diloweralkoxy-4-morpholinobenzene diazonium salt.

3. A photographic process as described in claim 1 wherein the blue coupler component is said 2-hydroxy-N-(2,4-diloweralkoxy-5-halophenyl)-3-naphthamide.

4. A photographic process as described in claim 1 wherein the molar ratio of blue coupler to yellow coupler is from about 0.9:1 to about 1.1:1.

5. A photographic process as described in claim 1 wherein the molar ratio of total moles of said blue and yellow coupler components to said diazonium salt component is from about 1:1 to about 1.5:1.

6. A photographic process as described in claim 1 wherein the diazonium salt is 4-morpholinobenzene diazonium fluoborate, the blue coupler is 2-hydroxy-N-(2-methoxyphenyl)-3-naphthamide, and the yellow coupler is 5-acetamido-2-methylphenol.

References Cited

UNITED STATES PATENTS

| | | | |
|---|---|---|---|
| 2,405,523 | 8/1946 | Sease et al. | 96—91 R |
| 2,893,866 | 7/1959 | Haefeli | 96—91 R |
| 3,069,268 | 12/1962 | Herrick | 96—75 X |
| 3,373,021 | 3/1968 | Adams et al. | 96—75 X |
| 3,473,930 | 10/1969 | Werner | 96—91 R |
| 3,498,791 | 3/1970 | Rauhut et al. | 96—91 R |
| 3,585,033 | 6/1971 | Desjarlais | 96—49 |
| 3,591,381 | 7/1971 | Gray et al. | 96—91 R |
| 3,573,051 | 3/1971 | Gray | 96—91 R |
| 3,255,010 | 6/1966 | Sus et al. | 96—91 R |
| 2,485,122 | 10/1949 | Von Glahn et al. | 96—91 R |
| 2,233,038 | 2/1941 | Sus et al. | 96—91 R |
| 3,113,025 | 12/1963 | Bialczak | 96—91 R |
| 3,427,162 | 2/1969 | Halperin | 96—49 |
| 3,248,220 | 4/1966 | Van Rhijh | 96—91 R |
| 3,408,203 | 10/1968 | Sus et al. | 96—91 R |
| 3,484,241 | 12/1969 | Evleth et al. | 96—49 |
| 3,411,906 | 11/1968 | Boone et al. | 96—49 |

FOREIGN PATENTS

| | | | |
|---|---|---|---|
| 6413561 | 5/1965 | Netherlands | 96—91 R |
| 867,432 | 5/1961 | Great Britain | 96—91 |
| 937,510 | 9/1963 | Great Britain | 96—91 |

OTHER REFERENCES

Kosar, J., "Light Sensitive Systems," Wiley & Sons, 1965, p. 223.

CHARLES L. BOWERS, JR., Primary Examiner

U.S. Cl. X.R.

96—75, 91 R